UNITED STATES PATENT OFFICE.

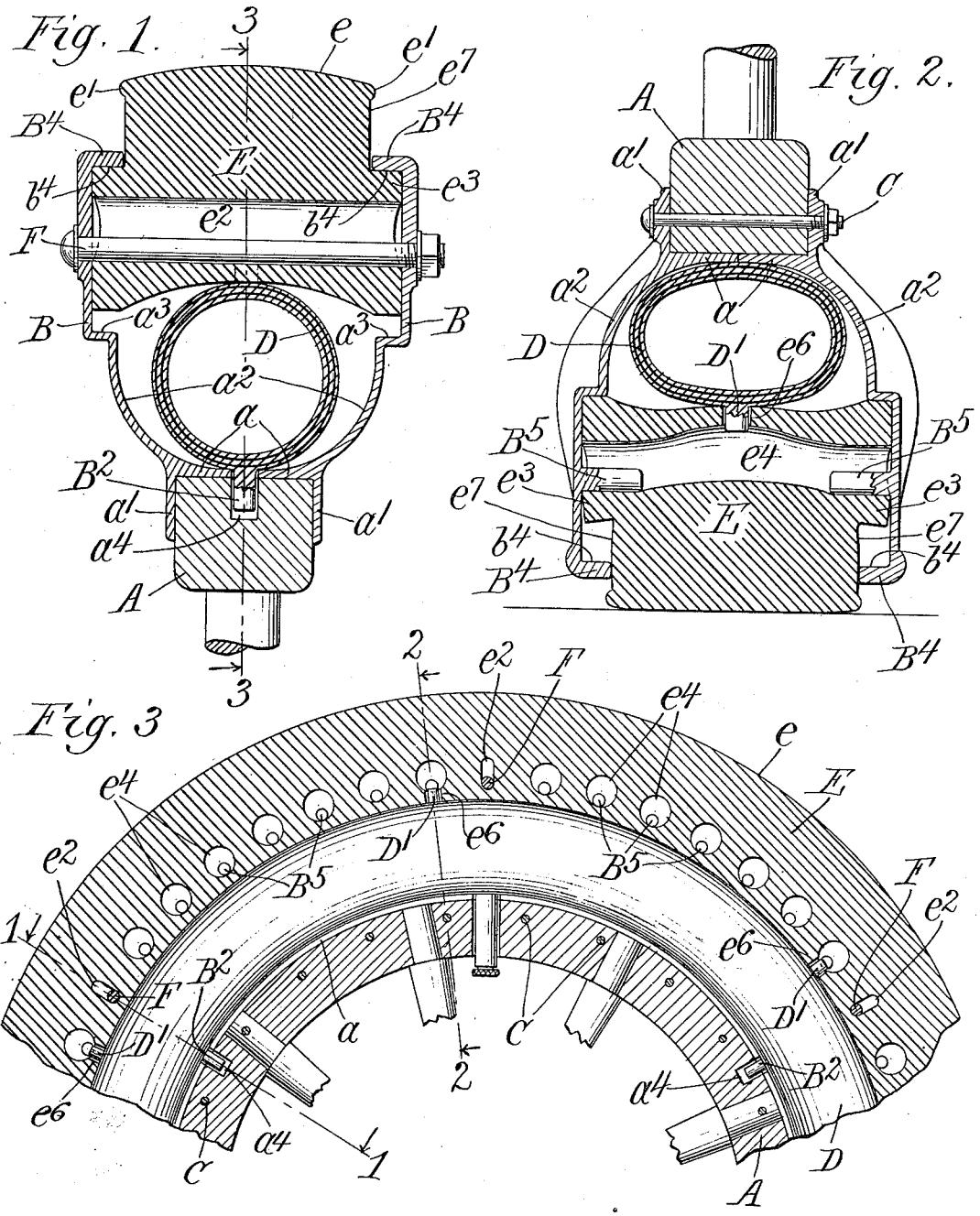

MELVILLE CLARK, OF CHICAGO, ILLINOIS.

VEHICLE-WHEEL TIRE.

990,956.  Specification of Letters Patent.  Patented May 2, 1911.

Application filed June 22, 1908. Serial No. 439,700.

*To all whom it may concern:*

Be it known that I, MELVILLE CLARK, a citizen of the United States, residing at Chicago, in the county of Cook and State of Illinois, have invented new and useful Improvements in Vehicle-Wheel Tires, of which the following is a specification, reference being had to the drawings forming a part thereof.

The purpose of this invention is to provide an improved construction of vehicle wheel having a pneumatically cushioned tire in which the pneumatic cushion shall be fully protected from puncture, and in which also, upon deflation of the cushion from any cause, the tire shall be self-cushioning and the wheel substantially unimpaired for service except as to the diminution of cushion resulting from the loss of the pneumatic cushion.

It consists in the features of construction shown and described as indicated in the claims.

In the drawings:—Figure 1 is a section of a wheel containing this invention radial with respect to the wheel and transverse with respect to the tire and felly, showing the pneumatic cushion fully inflated, section being made at the line 1—1 on Fig. 3. Fig. 2 is a view similar to Fig. 1 showing the condition with the pneumatic cushion deflated and the wheel under a load, section being made at the line 2—2 on Fig. 3. Fig. 3 is a section at the line 3—3 on Fig. 1 extending throughout about one-third of the circumference of the wheel and showing the pneumatic cushion in side elevation.

The construction of the wheel from hub to felly may be of any suitable type, and this part of the construction is not illustrated. The felly, A, may be of wood clamped between two annular tire-retaining guards, B, B, which are preferably made of cast steel for rigidity. Each of said guards comprises an angular seat made by the two flanges, $a$, $a^1$, for lodgment upon and engagement with the felly which is clamped between the opposed flanges, $a^1$, $a^1$, of the two opposite guards by means of bolts, C, taking through both said flanges and the intervening felly, said bolts being sufficiently frequent in the circumference of the wheel to insure permanent rigidity of the felly and the two guards. The upper or outer surface of the horizontal flange, $a$, forms the inner seat of the pneumatic cushion, D, and said inner seat extends divergently outward in the curved path of the inner surface of the portion, $a^2$, of the web of the guard to an outwardly facing shoulder, $a^3$, at a point at which the said web is offset outwardly for that purpose. From the outer corner of said seat, $a^3$, the web projects directly outward,—that is, in a plane at right angles to the axis of the wheel,—for a distance sufficient to accommodate, with a limited range of play, a corresponding feature of the tread element of the tire hereinafter described. These guards, B, terminate circumferentially in an inturned lip or flange, $B^4$, somewhat wider than the shoulder, $a^3$, so that there is formed between the said shoulder, $a^3$, and the inner face, $b^4$, of the flange, $B^4$, a lateral recess in each of said guards. The purpose of these recesses is to receive and engage the tire proper, or tread element of the tire, as it may be termed, E. This tread element is an annular rubber element having the tread surface, $e$, transversely convex and terminating in outwardly projecting beads or fillets, $e^1$, $e^1$, from which inward the opposite sides of the said rubber tire element are parallel, extending to the cylindrical shoulders, $e^3$, formed by the widening of the tire at that point, the width of the shoulders, $e^3$, being substantially the width of the flanges, $B^4$, of the guards, B, under or within which said shoulders engage when the tire element, E, is in place on the wheel between said guards. Said rubber tire element, E, has at its lateral surfaces a diameter greater than the diameter of the guards, B, at the shoulders, $a^3$, by the amount which is allowed for normal compression of the pneumatic cushion, D, so that at such limit of normal compression, the tire element, E, will seat, opposite the tread, against the shoulders, $a^3$, thereby preventing further compression of the pneumatic cushion except to the extent that the tire element, E, may yield at the middle of its width, at which it is not restrained by said cushion. The said tire element, E, is hollowed between its lateral margins, preferably in the form of an arch spanning and completing the inclosure of the chamber in which the pneumatic cushion is lodged, the remainder of whose bounding wall is formed by the two guards, as described.

In addition to the bolts by which the guards, B, B, are clamped onto the felly, they are connected together by bolts, F, at intervals in the circumference of the wheel as frequently as may be judged desirable (the drawings showing them at intervals of 60°), said bolts taking through radially elongated apertures, $e^2$, in the rubber tire element, E, the elongation of the apertures being designed to accommodate the radial yielding to movement of the said tire element under a load. In addition to the said radially elongated apertures, $e^2$, the tire element, E, has cylindrical apertures, $e^4$, at short intervals throughout the entire circumference, seven such apertures being shown between consecutive bolt apertures, $e^2$, thus making the entire number of apertures in the element, E, including the bolt apertures, 48. The guards, B, are provided with inwardly projecting studs, $B^5$, of substantially the same diameter as the bolts, F, taking into the cylindrical apertures, $e^4$, and engaging the said tire element, E, for limiting its radial yielding movement to the amount of the difference between the diameter of the stud and the diameter of the apertures, $e^4$,—that is, to the same amount of movement which is allowed by the elongation of the bolt holes, $e^2$. The length of the studs, $B^5$, is preferably at least double the width of the shoulder, $a^3$, so that the studs take into the rubber tire element, E, for a distance inward from the annular faces, $e^7$, as great at least as the projection of the inner portion of said rubber tire element outward from said faces. This protrusion of the studs into the tire element, E, is designed and tends to prevent the compression of the tire at the middle portion of the width,—which may occur in case of deflation of the pneumatic cushion,—from operating to pry out the shoulders, $e^3$, of the rubber tire element from under the lips or retaining flanges, $B^4$, of the guard, and also to support said rubber tire element positively on the studs for a sufficient portion of the width from the two sides inward to substantially carry the load after the compression of said tire element at the middle where it is supported only by the pneumatic cushion has rendered the outer tread surface substantially flat and has transferred the load practically to the marginal portions which are thus supported by the studs. The studs also operate to prevent the tire being thrown out by centrifugal force under high speed.

The pneumatic core or cushion, D, is designed to be substantially non-stretchable, being made up of several plies of rubber saturated and embedded fabric with proper rubber lining to insure retention of the air; and it is also designed to be considerably less in diameter or width than the width of the cavity or chamber provided for it between the curved web faces, $a^2$, and the overhanging arched face of the rubber tire element, E, so that upon compression under load its lateral expansion shall be free,— that is, without restraint by reason of reaching any positive restraining wall. When thus constructed and lodged in a chamber of the form indicated, such core would be liable, in the absence of any preventive means, to slip or be displaced to one side of the chamber so as not to lie directly in the line of pressure of the load, and so not to operate most effectively for cushioning the load. Also in lodging in the chamber such a core or pneumatic cushion, since it is preferably made normally of a little greater diameter than the chamber so as to normally press against its inner and outer seats,— viz., the felly or flange, $a$, of the guard which encompasses the felly, and the overhanging arched face of the tire element, E,—the core or tube is liable to be distorted or twisted more or less, and when afterward inflated the twist may not be always taken out, and on the contrary a spiral wrinkle or crease is liable to be formed and to result in weakening if not in breaking the fibers along the line of such wrinkle. To prevent both of these difficulties and also for the further purpose of preventing the core or pneumatic cushion from creeping circumferentially around the wheel in travel, I provide such core or pneumatic cushion with nipples or lugs, $D^1$, projecting radially from its outer circumference and taking into pockets or recesses, $e^6$, which are formed in the rubber tire element, E, at the middle of its width, which is the crown of the arched face which incloses the pneumatic cushion; and I provide also similar lugs, $B^2$, projecting radially from the inner circumference of the cushion and taking through or past the edges of the flanges, $a$, of the guards into sockets, $a^4$, in the circumference of the felly, A. It will be seen that in lodging the pneumatic cushion in its seat about the felly, the engagement of the studs or nipples, $B^2$, with the pockets of the felly will accurately position said cushion so that the projections, $D^1$, will take properly into the corresponding apertures, $e^6$, of the rubber tread element, E, and that such engagement of the core at both its inner and outer circumference insures it against rolling or sliding laterally, as well as against creeping and distortion.

I claim:—

1. In a vehicle wheel, in combination with the felly, lateral guards secured thereto; a tire engaged between the guards, such tire having a multiplicity of apertures extending through it from side to side, the guards having a like multiplicity of studs projecting inwardly for engaging with said apertures of the tire, the apertures being of greater dimension radially with respect to the wheel than the studs, the excess of such dimension being outward from the studs when the tire is at normal position with respect to the guards.

2. In a vehicle wheel, in combination with a felly and lateral guards secured thereto, said guards having each on its inner face an annular recess bounded by cylindrical shoulders at its inner and outer circumference; a tire engaged between such guards having at opposite sides annular projections bounded by cylindrical shoulders, the width of said annular projections of the tire being less than the width of the annular recesses of the guards, the tire having a multiplicity of apertures distributed about its circumference extending through it from side to side and emerging at the surface of said lateral annular projections; guards having a like multiplicity of studs projecting from the bottom of their said annular cavities for engaging said apertures of the tire.

3. In a vehicle wheel in combination with a felly and lateral guards secured thereto, said guards having each on its inner face an annular recess bounded by cylindrical shoulders at its inner and outer circumference; a tire engaged between such guards having at opposite sides annular projections bounded by cylindrical shoulders, the width of said annular projections of the tire being less than the width of the annular recesses of the guards, the tire having a multiplicity of apertures distributed about its circumference extending through it from side to side and emerging at the surface of said lateral annular projections; guards having a like multiplicity of studs projecting from the bottom of their said annular cavities for engaging the said apertures of the tire, the length of the studs being greater than the depth of said lateral recesses of the guards.

4. In a vehicle wheel in combination with a felly and lateral guards secured thereto, a tire element engaged between said guards, said guards having annular recesses and the tire having annular projections for such engagement, the projections being narrower than the recesses and permitting radial movement of the tire with respect to the wheel to the extent of the difference in said widths, the tire having a multiplicity of apertures extending through it and the guards having a like multiplicity of studs taking into said apertures, the dimension of the apertures both radially with respect to the wheel and circumferentially with respect thereto being greater than that of the studs, the tire having other apertures elongated radially with respect to the wheel, and bolts connecting the opposite guards taking through such apertures and occupying the entire dimension thereof circumferentially with respect to the wheel.

In testimony whereof, I have hereunto set my hand, in the presence of two witnesses, at Chicago, Illinois, this 8'' day of June, 1908.

MELVILLE CLARK.

In the presence of—
ALBERT H. PAGE,
E. F. CLARK, Jr.